United States Patent Office 3,847,935
Patented Nov. 12, 1974

3,847,935
5-SUBSTITUTED 1-(3H,1,4-BENZODIAZEPIN-2-YL)-2-IMIDAZOLIDINONES
Robert Bruce Moffett, Kalamazoo, Mich., assignor to The Upjohn Company, Kalamazoo, Mich.
No Drawing. Filed Apr. 12, 1972, Ser. No. 243,471
Int. Cl. C07d 53/06
U.S. Cl. 260—309.7          7 Claims

ABSTRACT OF THE DISCLOSURE

Novel 5-substituted 1 - (3H-1,4-benzodiazepin-2-yl)-2-imidazolidinones, the intermediate 5-substituted 1-(2-haloalkyl-3-(3H-1,4-benzodiazepin - 2 - yl)-ureas, pharmacologically acceptable acid addition salts thereof, and processes for their production. The compounds and intermediates of this invention and the pharmacologically acceptable acid addition salts thereof are central nervous system depressants. They are useful as sedatives, hypnotics, tranquilizers, muscle relaxants and anticonvulsants, and also as feed additives for increasing growth rate and feed efficiency of livestock and poultry, milk production in the mammals and egg production in birds.

SUMMARY OF THE INVENTION

The novel 1-(3H-1,4-benzodiazepin-2-yl-2-imidazolidinones of this invention are illustratively represented by generic formula I, and the novel intermediate 1-(2-haloalkyl)-3-(3H-1,4-benzodiazepine-2-yl)-ureas by generic formula II as follows:

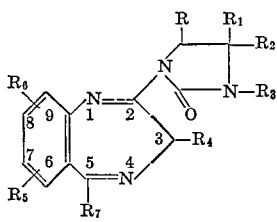

I

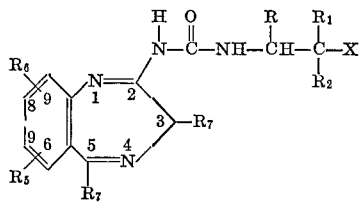

II wherein R, $R_1$ and $R_2$ are each selected from the group consisting of hydrogen and lower alkyl of 1 to 3 carbon atoms, inclusive; $R_3$ is selected from the group consisting of hydrogen, lower alkyl of 1 to 4 carbon atoms, inclusive, and lower alkenyl of 3 to 4 carbon atoms, inclusive; $R_4$ is selected from the group consisting of hydrogen, alkyl of 1 to 3 carbon atoms, inclusive, hydroxy, acetoxy and propionoxy; $R_5$ and $R_6$ are each selected from the group consisting of hydrogen, lower alkyl of 1 to 3 carbon atoms, inclusive, halogen, nitro, cyano, amino, trifluoromethyl, lower alkoxy, lower alkylthio, lower alkylsulfinyl, lower alkylsulfonyl, lower alkanoylamino and lower dialkylamino in which the carbon chain moieties are of 1 to 3 carbon atoms, inclusive; $R_7$ is selected from the group consisting of pyridyl, 2-pyrimidinyl, furyl, pyrryl, thienyl, cycloalkyl of 5 to 7 carbon atoms, inclusive, and cycloalkenyl of 5 to 7 carbon atoms, inclusive, and a phenyl radical of the formula

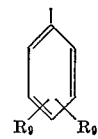

in which $R_8$ and $R_9$ each have the same meanings as given above for $R_5$ and $R_6$; and X is selected from the group consisting of chloro and bromo.

In this application the lower alkyl of 1 to 3 carbon atoms, inclusive, is exemplified by methyl, ethyl, propyl and isopropyl. The term lower alkyl of 1 to 4 carbon atoms, inclusive, is exemplified by methyl, ethyl, propyl, isopropyl, n-butyl, sec.-butyl and tert.-butyl. Halogen is exemplified by fluoro, chloro, and bromo. Lower alkoxy is exemplified by methoxy, ethoxy, propoxy and isopropoxy. Lower alkylthio is exemplified by methylthio, ethylthio, propylthio and isopropylthio. Lowever alkylsulfinyl is exemplified by methylsulfinyl, ethylsulfinyl, propylsulfinyl and isopropylsulfinyl. Lowever alkylsulfonyl is exemplified by methylsulfonyl, ethylsulfonyl, propylsulfonyl and isopropylsulfonyl. Lower alkanoylamino exemplified by formylamino, acetylamino, propionylamino and isopropionylamino. Lower dialkylamino is exemplified by dimethylamino, diethylamino, methylethylamino, methylpropylamino, ethylpropylamino, dipropylamino, diisopropylamino and the like. Lowever alkenyl of 3 to 4 carbon atoms, inclusive, is exemplified by 2-butenyl, 3-butenyl, 2-methylpropenyl, allyl, and the like. Cycloalkyl is exemplified by cyclopentyl, cyclohexyl and cycloheptyl. Cycloalkenyl is exemplified by 1-cyclopentenyl, 1-cyclohexenyl, 1-cycloheptenyl, 2-cyclopentenyl, 2-cyclohexenyl, 2-cycloheptenyl, 3-cyclopentenyl, 3-cyclohexenyl, 3-cycloheptenyl and 4-cycloheptenyl.

The novel 1 - (3H-1,4-benzodiazepin-2-yl)-2-imidazolinones of formulae I above, and the intermediate 1-(2-haloalkyl)-3H-1,4-benzodiazepine-2-yl)-ureas of formula II exist in either the non-protonated (free base) form or in the protonated (acid addition salt) form, depending on the pH of the environment. They form stable protonates, i.e., pharmacologically acceptable acid addition salts, on acidification of the free base with suitable pharmacologically acceptable acids, for example, hydrochloric, hydrobromic, sulfuric, phosphoric, nitric, acetic, propionic, palmitic, benzoic, salicylic, hexynoic, phenylbutric, naphthoic, glycolic, succinic, nicotinic, tartaric, maleic, malic, pamoic, methanesulfonic, cyclohexanesulfonic, citric, and latic acids, and the like. Conversely, the free bases of the novel compounds of formulae I and II can be obtained from a salt (e.g., from the hydrochloride or sulfate salt) by neutralization with a base such as sodium hydroxide, extracting with an immiscible solvent, for example chloroform, drying the extract, for example with anhydrous sodium sulfate, and removing the solvent by evaporation.

The novel compounds of formulae I and II and the pharmacologically acceptable acid addition salts thereof have sedative, hypnotic, anticonvulsant, tranquilizing and muscle relaxant effects in mammals and birds, and as feed additives for increasing the growth rate and feed efficiency of livestock and poultry, milk production during lactation in the mammalian species and egg production in birds.

3

Sedative effects of the compounds of this invention are shown by the following tests in mice:

*Chimney test:* [Med. Exp. *4*, 1945 (1961)]: The test determines the ability of mice to back up and out of a vertical glass cylinder within 30 seconds. At the effective dosage, 50% of the mice failed to do so.

*Dish test:* Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish.

*Pedestal test:* The untreated mouse leaves a standard pedestal in less than a minute to climb back to the floor of the standard mouse box. Tranquilized mice will stay on the pedestal for more than 1 minute.

*Nicotine antagonism test:* Mice in a group of 6 are injected with the test compound. Thirty minutes later the mice including control (untreated )mice are injected with nicotine salicylate (2 mg./kg.). The control mice show over-stimulation, i.e., (1) running convulsions followed by (2) tonic extensor fits followed by (3) death.

*Antagonism to strychnine (as sulfate):* The test consists in orally administering into groups of 6 mice the test compounds, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The following compounds typical of this invention have (by intraperitoneal injection) $ED_{50}$ as shown in the table below:

| Compound | $ED_{50}$ (in mg./kg.) | | | | |
|---|---|---|---|---|---|
| | Ch | D | P | Ni (3) | Str |
| 1-(7-chloro-5-phenyl-3H-1,4-benzo-diazepin-2-yl)-3-methyl imidazo-lidin-2-one | 32 | 10 | 18 | 16 | 36 |
| 1-(2-chloroethyl)-3-[7-chloro-5-(o-chlorophenyl)-3H-1,4-benzo-diazepin-2-yl]-urea | 20 | 40 | 56 | 16 | 200 |

Note.—Ch=Chimney test; D=Dish test; P=Pedestal test; Ni= Nicotine antagonism (3) test; Str=Strychnine antagonims.

The pharmaceutical forms contemplated by this invention include pharmaceutical compositions suited for oral, parenteral and rectal use, e.g., tablets, powder packets, chachets, dragées, capsules, solutions, suspensions, sterile injectable forms, suppositories, bougies, and the like. For oral administration suitable diluents or carriers such as carbohydrates (lactose), proteins, lipids, calcium phosphate, cornstarch, stearic acid, methylcellulose and the like can be used as carriers or for coating puprposes. Oil, such as coconut oil, sesame oil, safflower oil, cottonseed oil and peanut oil can be used for preparing solutions or suspensions of the active drug. Sweetening, coloring, and flavoring agents can be added.

For mammals and birds, food premixes, with starch, oatmeal, dried fishmeat, fishmeal, flour and the like can be prepared. These are then incorporated into an animal feed.

As feed additives the compounds of formulate I, II, and III can be used in dosages of 0.003 mg. to 50 mg./animal/day in a feed to increase growth, feed consumption and feed efficiency in livestock and poultry, milk production on the mammals and egg production in birds.

As tranquilizers the compounds of Formulae I, II, and III can be used in dosages of 0.01 mg. to 20.0 mg./kg. in oral or injectable preparations as described above, to alleviate tension and anxiety in mammals, or birds, such as e.g., occurs when animals are being shipped.

4

DETAILED DESCRIPTION OF THE INVENTION

The novel compounds of this invention and processes for their production are illustratively represented by the following sequence of formulae:

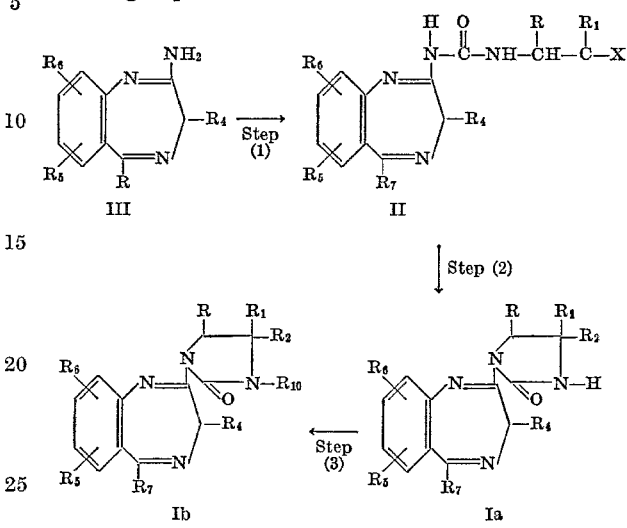

wherein R, $R_1$, $R_2$, $R_3$, $R_4$, $R_5$, $R_6$, $R_7$ and X have the meanings previously given, and $R_{10}$ is selected from the group consisting of lower alkyl of 1 to 4 carbon atoms inclusive and lower alkenyl of 3 to 4 carbon atoms, inclusive.

The compounds of formula Ia and Ib are combined to form the compounds of generic formula I, above.

The starting compounds of formula III are prepared by reacting a known compound of the formula:

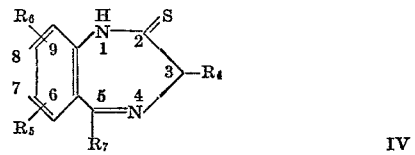

IV wherein $R_4$, $R_5$, $R_6$ and $R_7$ have the same meanings as previously given, with phosphorus pentasulfide in a solvent such as pyridine, benzene, toluene or xylene at between about 80 to about 140° C. for between about 30 minutes to about 6 hours in accordance with the procedure disclosed by Archer et al., J. Org. Chem. *29*, 231 (1964) and U.S. Pat. 3,422,091, to obtain the corresponding 2-tiones of the formula V:

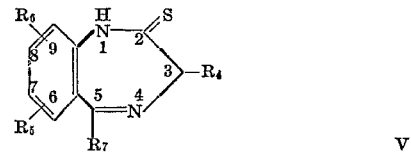

V wherein $R_4$, $R_5$, $R_6$ and $R_7$ have the meanings previously given. The compounds of formula V, thus obtained are then treated with amonia in accordance with Preparations 1 and 2, hereinafter, to obtain the corresponding 2-amino compounds of formula III.

The preparation of compounds of formula IV are described in U.S. Pats. 3,100,770; 3,179,565; 3,268,586; 3,338,886; 3,466,328; 3,422,091 and 3,573,282; Belgian Pats. 619,101 and 662,240; French Pats. 1,391,752 and 1,455,048; Netherlands Pats. 65/07637; 67/08568 and 69/08966; J. Pharm. Sci., 53, 264 (1964); and Earley et al., J. Med. Chem. 11, 774 (1968).

The process of this invention comprises the following steps:

(1) A 2-amino-3H-1,4-benzodiazepine (III) in a solvent such as tetrahydrofuran, benzene, toluene, pyridine, xylene, methylene chloride, alkanols, e.g., methanol, ethanol, and the like is reacted with a 2-haloalkylisocyanate of the formula:

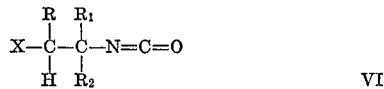

VI wherein R, $R_1$, $R_2$ and X have the meanings given above. A molar excess of the isocyanate is generally employed and 2 to 5 moles of isocyanate per mole of benzodiazepine starting material is preferred. The reaction is carried out within a temperature range of from about 0° C. to about 125° C., for a period of from about 1 to 24 hours. The product II, the corresponding 1-(2-haloalkyl)-3-(3H-1,4-benzodiazepine-2-yl)-urea, thus obtained, is recovered from the reaction mixture by conventional metthods, such as crystallization and/or chromatography, for example the solvent is removed by distillation and the residue thus obtained is crystallized from a suitable solvent such as, an alkanol, e.g., methanol, ethanol, propanol, isopropanol and the like, methylene chloride, ethyl acetate, chloroform, hexanes, mixtures thereof and the like to obtain the desired compound II.

(2) The 1-(2-haloalkyl)-3-(3H-1,4-benzodiazepine-2-yl)-urea, thus obtained is treated with an anhydrous strong base, such as an alkali metal hydride, e.g., sodium hydride, potassium hydride or lithium hydride; an alkali metal alkoxide, e.g., sodium methoxide, potassium ethoxide, thallium ethoxide and sodium tert. butoxide; anhydrous alkali metal hydroxides e.g., sodium and potassium hydroxide, sodium amide and the like, to effect ring closure of the urea to obtain the corresponding 1-(3H-1,4-benzodiazepine - 2-yl)-2-imidazolidinone (Ia). The cyclization reaction is preferably carried out in a suitable organic solvent such as tetrahydroguran, benzene, toluene, xylene, methylene chloride, hexanes, alkanols, e.g., methanol, ethanol, 1-propanol, 2-propanol, and the like.

The cyclization can be carried out within a broad temperature range, example from about 0° C. to about 150° C., for a period of from about 1 to about 48 hours, depending in part on the temperature employed. Ambient temperatures, about 20° to about 30° C., are generally preferred in carrying out the cyclization and a period of from about 8 to about 24 hours is generally sufficient. The product (Ia) is recovered from the reaction mixture by conventional methods, for example, the reaction mixture is neutralized with an acid such as acetic acid, hydrochloric acid, sulfuric acid and the like, organic acids are preferred, and the product is recovered in the manner disclosed in step 1, above.

(3) In carrying out the process of step 3, the selected compound (Ia), thus obtained, taken up in an appropriate organic solvent, such as, dimethylformamide, tetrahydrofuran, dioxane, carbon tetrachloride, benzene, xylene, an anhydrous alkanol, e.g., methanol, ethanol, 1-propanol, 2-propanol, 1-butanol, 2-butanol, 3-butanol, and the like, treated with an equimolar quantity of an anhydrous strong base such as, for example those named in Step 2, above, and reacted with an alkyl or alkenyl halide of the formula:

$R_{10}$—$X_1$   VII wherein $R_{10}$ has the meaning previously given and $X_1$ is bromine, chlorine or iodine, to obtain the corresponding 1-(3H - 1,4 - benzodiazepin-2-yl)-3-substituted-2-imidazolidinone of formula Ib. The reaction is carried out within a broad temperature range, for example, from about 0 to about 150° C. Ambient temperatures, about 20–30° C., are generally preferred for carrying out the reaction. A period of from about 1 to about 24 hours is generally sufficient for completion of the reaction. The compounds of formula Ib thus obtained are recovered from the reaction mixture and purified by conventional methods for example as disclosed in Step 1, above.

The following examples are illustrative of the products and processes of this invention but are not to be construed as limiting.

*Preparation 1.*—2-amino-7-chloro-5-phenyl-3H-1,4-benzo diazepine (III)

A solution of 2.87 g. (10 millimoles) of 7-chloro-1,3-dihydro - 5 - phenyl-2H-1,4-benzodiazepine-2-thione (V) (prepared as in J. Org. Chem., 29, 231) in 50 ml. of methanol saturated with ammonia gas is stirred at 24–26° C. (room temperature) for about 2½ hours. Crystallization occurs during stirring. The crystals thus obtained are recovered by filtration and dried, to yield 1.55 g. (57.5%) of 2 - amino-7-chloro-5-phenyl-3H-1,4-benzodiazepine (III) m.p. 236–237° C.

*Analysis.*—Calcd. for $C_{15}H_{12}ClN_3$: C, 66.79; H, 4.49; Cl, 13.15; N, 15.57. Found: C, 66.97; H, 4.53; Cl, 13.15; N, 15.49.

*Preparation 2.*—2-amino-7-chloro-5-(o-chlorophenyl)-3H-1,4-benzodiazepine (III)

Following the procedure of Preparation 1, above, 7-chloro - 1,3-dihydro-5-(o-chlorophenyl)-2-1,4-benzodiazepine-2-thione (V) is treated with ammonia to obtain 2-amino - 7 - chloro-5-(o-chlorophenyl)-3H-1,4-benzodiazepine (III), m.p. 241–5–242° C. (decomp).

Following the procedure of Preparation 1 but substituting other representative 1,3-dihydro-2H-1,4-benzodiazepine-2-thiones (V) as starting materials, such as (1) 1,3-dihydro-5-phenyl-2H-1,4-benzodiazepine-2-thione (V),
(2) 6-chloro-1,3-dihydro-5-(m-bromophenyl)-2H-1,4-benzodiazepine-2-thione (V),
(3) 8-chloro-1,3-dihydro-5-phenyl-2H-1,4-benzodiazepine-2-thione (V),
(4) 7-chloro-1,3-dihyro-5-(3,4-dimethylphenyl)-2H-1,4-benzodiazepine-2-thione (V),
(5) 1,3-dihydro-5(-2-methyl-4-methoxyphenyl)-2H-1,4-benzodiazepine-2-thione (V),
(6) 9-bromo-1,3-dihydro-5-phenyl-2H-1,4-benzodiazepine-2-thione (V),
(7) 1,3-dihydro-7-nitro-5-phenyl-2H-1,4-benzodiazepine-2-thione (V),
(8) 1,3-dihydro-5-[p-(propionylamino)phenyl]-9-trifluoromethyl-2H-1,4-benzodiazepine-2-thione (V),
(9) 8-cyano-1,3-dihydro-5-[p-(trifluoromethyl)-phenyl]-2H-1,4-benzodiazepine-2-thione (V),
(10) 7-chloro-1,3-dihydro-5-(o-chlorophenyl)-2H-1,4-benzodiazepine-2-thione (V),
(11) 1,3-dihydro-6-ethylthio-5-(o-bromophenyl)-2H-1,4-benzodiazepine-2-thione (V),
(12) 6,8-dichloro-1,3-dihydro-5-(o-fluorophenyl)-2H-1,4-benzodiazepine-2-thione (V),
(13) 7-bromo-1,3-dihydro-5-[m-(ethylsulfinyl)phenyl]-8-propoxy-2H-1,4-benzodiazepine-2-thione (V),
(14) 1,3-dihydro-9-diisopropylamino-7-methyl-5-[m-(propylsulfonyl)phenyl]-2H-1,4-benzodiazepine-2-thione (V),
(15) 7-bromo-1,3-dihydro-5-(o-fluorophenyl)-2H-1,4-benzodiazepine-2-thione (V),
(16) 1,3-dihydro-5-(o-fluorophenyl)-3-methyl-2H-1,4-benzodiazepine-2-thione (V),
(17) 1,3-dihydro-5-(p-fluorophenyl)-3-methyl-2H-1,4-benzodiazepine-2-thione (V),
(18) 7-bromo-5-(o-bromophenyl)-1,3-dihydro-2H-1,4-benzodiazepine-2-thione (V),
(19) 1,3-dihydro-5-(o-fluorophenyl)-7-methylsulfinyl-2H-1,4-benzodiazepine-2-thione (V),
(20) 1,3-dihydro-7-methylthio-5-phenyl-2H-1,4-benzodiazepine-2-thione (V),
(21) 5-(o-chlorophenyl)-1,3-dihydro-3,6,8-trimethyl-2H-1,4-benzodiazepine-2-thione (V),
(22) 7,8-dicyano-1,3-dihydro-5-[p-(methylsulfonyl)-phenyl]-2H-1,4-benzodiazepine-2-thione (V),
(23) 6,8-diethyl-1,3-dihydro-5-(m-ethylphenyl)-2H-1,4- benzodiazepine-2-thione (V),
(24) 5-(o-cyanophenyl)-1,3-dihydro-6-nitro-2H-1,4-benzodiazepine-2-thione (V),
(25) 9-acetylamino-5-(p-cyanophenyl)-1,3-dihydro-2H-1,4-benzodiazepine-2-thione (V),
(26) 7-chloro-1,3-dihydro-5-(4-pyridyl)-2H-1,4-benzodiazepine-2-thione (V),
(27) 1,3-dihydro-3-ethyl-7-fluoro-5-(2-pyrryl)-2H-1,4-benzodiazepine-2-thione (V),
(28) 7,9-dichloro-1,3-dihydro-3-propyl-5-(2-thienyl)-2H-1,4-benzodiazepine-2-thione (V),
(29) 7-bromo-1,3-dihydro-5-(4-pyridyl)-2H-1,4-benzodiazepine-2-thione (V),
(30) 1,3-dihydro-3-methyl-7-nitro-5-(2-pyrimidyl)-2H-1,4-benzodiazepine-2-thione (V),
(31) 1,3-dihydro-5-cyclopentyl-3-methyl-7-trifluoromethyl-2H-1,4-benzodiazepine-2-thione (V),
(32) 7-chloro-1,3-dihydro-5-cycloheptyl-3-ethyl-2H-1,4-benzodiazepine-2-thione (V),
(33) 1,3-dihydro-3-methyl-5-(2-pyridyl)-7-trifluoromethyl-2H-1,4-benzodiazepine-2-thione (V),
(34) 9-chloro-1,3-dihydro-5-(4-pyridyl)-7-trifluoromethyl-2H-1,4-benzodiazepine-2-thione (V),
(35) 1,3-dihydro-5-(2-pyrryl)-2H-1,4-benzodiazepine-2-thione (V),
(36) 1,3-dihydro-7-iodo-8-nitro-5-(2-pyridyl)-2H-1,4-benzodiazepine-2-thione (V),
(37) 3-ethyl-1,3-dihydro-7-nitro-5-(2-pyrryl)-2H-1,4-benzodiazepine-2-thione (V),
(38) 1,3-dihydro-5-(2-furyl)-7-methylthio-9-nitro-2H-1,4-benzodiazepine-2-thione (V),
(39) 7,8-dibromo-1,3-dihydro-3-methyl-5-(4-pyridyl)-2H-1,4-benzodiazepine-2-thione (V),
(40) 7-chloro-1,3-dihyro-5-(1-cyclopentyl)-2H-1,4-benzodiazepine-2-thione (V)
(41) 1,3-dihydro-5-(1-cyclohexenyl)-7-nitro-3-propyl-2H-1,4-benzodiazepine-2-thione (V),
(42) 8-bromo-1,3-dihydro-5-(1-cycloheptenyl)-3-ethyl-2H-1,4-benzodiazepine-2-thione (V),
(43) 7-chloro-1,3-dihydro-5-cyclohexyl-2H-1,4-benzodiazepine-2-thione (V),
(44) 9-chloro-1,3-dihydro-5-cyclopentyl-3-ethyl-2H-1,4-benzodiazepine-2-thione (V),
(45) 1,3-dihydro-7-nitro-5-(2-pyridyl)-2H-1,4-benzodiazepine-2-thione (V),
(46) 8-bromo-1,3-dihydro-5-(4-pyridyl)-2H-1,4-benzodiazepine-2-thione (V),
(47) 1,3-dihydro-9-fluoro-5-(2-pyrryl)-2H-1,4-benzodiazepine-2-thione (V),
(48) 7-bromo-8-chloro-1,3-dihydro-5-cyclopentyl-2H-1,4-benzodiazepine-2-thione (V),
(49) 8-bromo-1,3-dihydro-5-cycloheptyl-3-propyl-2H-1,4-benzodiazepine-2-thione (V),
(50 7,9-dichloro-1,3-dihydro-3-ethyl-5-(2-thienyl)-2H-1-4-benzodiazepine-2-thione (III), and the like, yields respectively,
(1) 2-amino-5-phenyl-3H-1,4-benzodiazepine (III),
(2) 2-amino-5-(m-bromophenyl)-6-chloro-3H-1,4-benzodiazepine (III),
(3) 2-amino-8-chloro-5-phenyl-3H-1,4-benzodiazepine (III),
(4) 2-amino-6-chloro-5-(3,4-dimethylphenyl)-3H-1,4-benzodiazepine (III),
(5) 2-amino-5-(2-methyl-4-methoxyphenyl)-3H-1,4-benzodiazepine (III),
(6) 2-amino-9-bromo-5-phenyl-3H-1,4-benzodiazepine (III),
(7) 2-amino-7-nitro-5-phenyl-3H-1,4-benzodiazepine (III),
(8) 2-amino-5-[p-(propionylamino)phenyl]-9-trifluoromethyl-3H-1,4-benzodiazepine (III),
(9) 2-amino-8-cyano-5-[p-(trifluoromethyl)phenyl]-3H-1,4-benzodiazepine (III),
(10) 2-amino-7-chloro-5-(o-chlorophenyl)-3H-1,4-benzodiazepine (III),
(11) 2-amino-6-ethylthio-5-(o-bromophenyl)-3H-1,4-benzodiazepine (III),
(12) 2-amino-6,8-dichloro-5-(o-fluorophenyl)-3H-1,4-benzodiazepine (III),
(13) 2-amino-7-bromo-5-[m-(ethylsulfinyl)phenyl]-8-propoxy-3H-1,4-benzodiazepine (III),
(14) 2-amino-9-diisopropylamino-7-methyl-5-[m-(propylsulfonyl)phenyl]-3H-1,4-benzodiazepine (III),
(15) 2-amino-7-bromo-5-(o-fluorophenyl)-3H-1,4-benzodiazepine (III),
(16) 2-amino-5-(o-fluorophenyl)-3-methyl-3H-1,4-benzodiazepine (III),
(17) 2-amino-5-(p-fluorophenyl)-3-methyl-3H-1,4-benzodiazepine (III),
(18) 2-amino-7-bromo-5-(o-bromophenyl)-3H-1,4-benzodiazepine (III),
(19) 2-amino-5-(o-fluorophenyl)-7-methylsulfinyl-3H-1,4-benzodiazepine (III),
(20) 2-amino-7-methylthio-5-phenyl-3H-1,4-benzodiazepine (III),
(21) 2-amino-5-(o-chlorophenyl)-3,6,8-trimethyl-3H-1,4-benzodiazepine (III),
(22) 2-amino-7,8-dicyano-5-[p-(methylsulfonyl)phenyl]-3H-1,4-benzodiazepine (III),
(23) 2-amino-6,8-diethyl-5-(m-ethylphenyl)-3H-1,4-benzodiazepine (III),
(24) 2-amino-5-(o-cyanophenyl)-6-nitro-3H-1,4-benzodiazepine (III),
(25) 9-acetylamino-2-amino-5-(p-cyanophenyl)-3H-1,4-benzodiazepine (III),
(26) 2-amino-7-chloro-5-(4-pyridyl)-3H-1,4-benzodiazepine (III),
(27) 2-amino-3-ethyl-7-fluoro-5-(2-pyrryl)-3H-1,4-benzodiazepine (III),
(28) 2-amino-7,9-dichloro-3-propyl-5-(2-thienyl)-3H-1,4-benzodiazepine (III),
(29) 2-amino-7-bromo-5-(4-pyridyl)-3H-1,4-benzodiazepine (III),
(30) 2-amino-3-methyl-7-nitro-5-(2-pyrimidyl)-3H-1,4-benzodiazepine (III),
(31) 2-amino-5-cyclopentyl-3-methyl-7-trifluoromethyl-3H-1,4-benzodiazepine (III),
(32) 2-amino-7-chloro-5-cycloheptyl-3-ethyl-3H-1,4-benzodiazepine (III),
(33) 2-amino-3-methyl-5-(2-pyridyl-7-trifluoromethyl-3H-1,4-benzodiazepine (III),
(34) 2-amino-9-chloro-5-(4-pyridyl)-7-trifluoromethyl-3H-1,4-benzodiazepine (III),
(35) 2-amino-5-(2-pyrryl)-3H-1,4-benzodiazepine (III),
(36) 2-amino-7-iodo-8-nitro-5-(2-pyridyl)-3H-1,4-benzodiazepine (III),
(37) 2-amino-3-ethyl-7-nitro-5-(2-pyrryl)-3H-1,4-benzodiazepine (III),
(38) 2-amino-5-(2-furyl)-7-methylthio-9-nitro-3H-1,4-benzodiazepine (III),
(39) 2-amino-7,8-dibromo-3-methyl-5-(4-pyridyl)-3H-1,4-benzodiazepine (III),
(40) 2-amino-7-chloro-5-(1-cyclopentyl)-3H-1,4-benzodiazepine (III),
(41) 2-amino-5-(1-cyclohexenyl)-7-nitro-3-propyl-3H-1,4-benzodiazepine (III),
(42) 2-amino-8-bromo-5-(1-cycloheptenyl)-3-ethyl-3H-1,4-benzodiazepine (III),
(43) 2-amino-7-chloro-5-cyclohexyl-3H-1,4-benzodiazepine (III),
(44) 2-amino-9-chloro-5-cyclopentyl-3-ethyl-3H-1,4-benzodiazepine (III),
(45) 2-amino-7-nitro-5-(2-pyridyl)-3H-1,4-benzodiazepine (III),
(46) 2-amino-8-bromo-5-(4-pyridyl)-3H-1,4-benzodiazepine (III),
(47) 2-amino-9-fluoro-5-(2-pyrryl)-3H-1,4-benzodiazepine (III),
(48) 2-amino-7-bromo-8-chloro-5-cyclopentyl-3H-1,4-benzodiazepine (III),

(49) 2-amino-8-bromo-5-cycloheptyl-3-propyl-3H-1,4-benzodiazepine (III),
(50) 2-amino-7,9-dichloro-3-ethyl-5-(2-thienyl)-3H-1,4-benzodiazepine (III), and the like.

EXAMPLE 1

1-(2-chloroethyl)-3-(7-chloro-5-phenyl-3H-1,4-benzodiazepin-2-yl)-urea (II)

To a solution of 2.7 g. (0.01 mole) of 2-amino-7-chloro-5-phenyl-3H-1,4-benzodiazepine (III) in 55 ml. of tetrahydrofuran is added 10 ml. of 2-chloroethylisocyanate (VI). The solution is stirred at room temperature for 4 hr. and evaporated to dryness in vacuo. Xylene is added and likewise evaporated to give a crystalline residue which is dissolved in 180 ml. of absolute ethanol, filtered hot, concentrated to 150 ml. and cooled yielding 2.6 g. (70%) of 1-(2-Chloroethyl)-3-(7-chloro-5-phenyl-3H-1,4-benzodiazepin-2-yl)-urea (II), m.p. 164–167° C. (dec. with darkening from 150° C. up); IR and NMR support the structure.

Analysis.—Calcd. for $C_{18}H_{16}Cl_2N_4O$: C, 57.61; H, 4.30. Cl, 18.90; N, 14.93. Found: C, 57.72; H, 4.30; Cl, 18.98; N, 14.54.

EXAMPLE 2

1-(2-chloroethyl)-3-[7-chloro-5-(o-chlorophenyl)-3H-1,4-benzodiazepin-2-yl]-urea (II)

To a suspension of 9.15 g. (0.03 mole) of 2-amino-7-chloro - 5 - (o - chlorophenyl) - 3H - 1,4-benzodiazepine (III) in 200 ml. of tetrahydrofuran under nitrogen at room temperature is added with stirring 13.34 g. (0.125 mole) of a 2-chloroethyl isocyanate (VI). The reaction mixture is stirred for about 4 hr. and then the solvent is evaporated to dryness in vacuo. The residue thus obtained is dissolved in xylene which is likewise evaporated and the resulting light yellow gum is crystallized from ethanol yielding 8.8 g. (71.5%) of 1 - (2 - chloroethyl)-3 - [7 - chloro - 5 - (o-chlorophenyl)-3H-1,4-benzodiazepin-2-yl]-urea (II), m.p. 155–158° C. (decomp. with darkening from 145° C. up); IR and NMR confirm the structure.

Analysis.—Calcd. for $C_{18}H_{15}Cl_3N_4O$: C, 52.77; H, 3.69; Cl, 25.96; N, 13.68. Found: C, 52.93; H, 3.94; Cl, 26.05; N, 13.30.

Following the procedure of Example 1 or Example 2, above, but substituting other representative 2-amino-3H-1,4-benzodiazepines (II) as starting materials, such as those prepared and listed in the paragraph following Preparation 2, above, yields respectively, (1) 1-(2-chloroethyl)-3-(5-phenyl-3H-1,4-benzodiazepin-2-yl)-urea (I),
(2) 1-(2-chloroethyl)-3-[5-(m-bromophenyl)-6-chloro-3H-1,4-benzodiazepin-2-yl]-urea (II),
(3) 1-(2-chloroethyl)-3-(8-chloro-5-phenyl-3H-1,4-benzodiazepin-2-yl)-urea (II),
(4) 1-(2-chloroethyl)3-[6-chloro-5-(3,4-dimethylphenyl)-3H-1,4-benzodiazepin-2-yl]-urea (II),
(5) 1-(2-chloroethyl)-3-[5-(2-methyl-4-methoxyphenyl)-3H-1,4-benzodiazepin-2-yl]-urea (II),
(6) 1-(2-chloroethyl)-3-(9-bromo-5-phenyl-3H-1,4-benzodiazepine-2-yl)-urea (II),
(7) 1-(2-chloroethyl)-3-(7-nitro-5-phenyl-3H-1,4-benzodiazepine-2-yl)-urea (II),
(8) 1-(2-chloroethyl)-3-[5-[p-(propionylamino)phenyl]-9-trifluoromethyl-3H-1,4-benzodiazepin-2-yl]-urea (II),
(9) 1-(2-chloroethyl)-3-[8-cyano-5-[p-(trifluoromethyl)phenyl]-3H-1,4-benzodiazepin-2-yl]-urea (II),
(10) 1-(2-chloroethyl)-3-[7-chloro-5-(o-chlorophenyl)-3H-1,4-benzodiazepin-2-yl]-urea (II),
(11) 1-(2-chloroethyl)-3-[6-ethylthio-5-(o-bromophenyl)-3H-1,4-benzodiazepin-2-yl]-urea (II),
(12) 1-(2-chloroethyl)-3-[6,8-dichloro-5-(o-fluorophenyl)-3H-1,4-benzodiazepin-2-yl]-urea (II),
(13) 1-(2-chloroethyl)-3-[7-bromo-5-[m-(ethylsulfinyl)phenyl]-8-propoxy-3H-1,4-benzodiazepin-2-yl]-urea (II),
(14) 1-(2-chloroethyl)-3-[9-diisopropylamino-7-methyl-5-[m-(propylsulfonyl)phenyl]-3H-1,4-benzodiazepin-2-yl]-urea (II),
(15) 1-(2-chloroethyl)-3-[7-bromo-5-(o-fluorophenyl)-3H-1,4-benzodiazepin-2-yl]-urea (II),
(16) 1-(2-chloroethyl)-3-[5-(o-fluorophenyl)-3-methyl-3H-1,4-benzodiazepin-2-yl]-urea (II),
(17) 1-(2-chloroethyl)-3-[5-(p-fluorophenyl)-3-methyl-3H-1,4-benzodiazepin-2-yl]-urea (II),
(18) 1-(2-chloroethyl)-3-[7-bromo-5-(o-bromophenyl)-3H-1,4-benzodiazepin-2-yl]-urea (II),
(19) 1-(2-chloroethyl)-3-[5-(o-fluorophenyl)-7-methylsulfinyl-3H-1,4-benzodiazepin-2-yl]-urea (II),
(20) 1-(2-chloroethyl)-3-(7-methylthio-5-phenyl-3H-1,4-benzodiazepin-2-yl)-urea (II),
(21) 1-(2-chloroethyl)-3-[5-(o-chlorophenyl)-3,6,8-trimethyl-3H-1,4-benzodiazepin-2-yl]-urea (II),
(22) 1-(2-chloroethyl)-3-[7,8-dicyano-5-[p-(methylsulfonyl)phenyl]-3H-1,4-benzodiazepin-2-yl]-urea (II),
(23) 1-(2-chloroethyl)-3-[6,8-diethyl-5-(m-ethylphenyl)-3H-1,4-benzodiazepin-2-yl]-urea (II),
(24) 1-(2-chloroethyl)-3-[5-(o-cyanophenyl)-6-nitro-3H-1,4-benzodiazepin-2-yl]-urea (II),
(25) 1-(2-chloroethyl)-3-[9-acetylamino-5-(p-cyanophenyl)-3H-1,4-benzodiazepin-2-yl]-urea (II),
(26) 1-(2-chloroethyl)-3-[7-chloro-5-(4-pyridyl)-3H-1,4-benzodiazepin-2-yl]-urea (II),
(27) 1-(2-chloroethyl)-3-[3-ethyl-7-fluoro-5-(2-pyrryl)-3H-1,4-benzodiazepin-2-yl]-urea (II),
(28) 1-(2-chloroethyl)-3-[7,9-dichloro-3-propyl-5-(2-thienyl)-3H-1,4-benzodiazepin-2-yl]-urea (II),
(29) 1-(2-chloroethyl)-3-[7-bromo-5-(4-pyridyl)3H-1,4-benzodiazepin-2-yl]-urea (II),
(30) 1-(2-chloroethyl)-3-[3-methyl-7-nitro-5-(2-pyrimidyl)-3H-1,4-benzodiazepin-2-yl]-urea (II),
(31) 1-(2-chloroethyl)-3-(5-cyclopentyl-3-methyl-7-trifluoromethyl-3H-1,4-benzodiazepin-2-yl)-urea (II),
(32) 1-(2-chloroethyl)-3-(7-chloro-5-cycloheptyl-3-ethyl-3H-1,4-benzodiazepin-2-yl)-urea (II),
(33) 1-(2-chloroethyl)-3-[3-methyl-5-(2-pyridyl)-7-trifluoromethyl-3H-1,4-benzodiazepin-2-yl]-urea (II),
(34) 1-(2-chloroethyl)-3-[9-chloro-5-(4-pyridyl)-7-trifluoromethyl-3H-1,4-benzodiazepin-2-yl]-urea (II),
(35) 1-(2-chloroethyl)-3-[5-(2-pyrryl)-3H-1,4-benzodiazepin-2-yl]-urea (II),
(36) 1-(2-chloroethyl)-3-[7-iodo-8-nitro-5-(2-pyridyl)-3H-1,4-benzodiazepin-2-yl]-urea (II),
(37) 1-(2-chloroethyl)-3-[3-ethyl-7-nitro-5-(2-pyrryl)-3H-1,4-benzodiazepin-2-yl]-urea (II),
(38) 1-(2-chloroethyl)-3-[5-(2-furyl)-7-methylthio-9-nitro-3H-1,4-benzodiazepin-2-yl]-urea (II),
(39) 1-(2-chloroethyl)-3-[7,8-dibromo-3-methyl-5-(4-pyridyl)-3H-1,4-benzodiazepin-2-yl]-urea (II),
(40) 1-(2-chloroethyl)-3-[7-chloro-5-(1-cyclopentyl)-3H-1,4-benzodiazepin-2-yl]-urea (II),
(41) 1-(2-chloroethyl)-3-[5-(1-cyclohexenyl)-7-nitro-3-propyl-3H-1,4-benzodiazepin-2-yl]-urea (II),
(42) 1-(2-chloroethyl)-3-[8-bromo-5-(1-cycloheptenyl)-3-ethyl-3H-1,4-benzodiazepin-2-yl]-urea (II),
(43) 1-(2-chloroethyl)-3-(7-chloro-5-cyclohexyl-3H-1,4-benzodiazepin-2-yl)-urea (II),
(44) 1-(2-chloroethyl)-3-(9-chloro-5-cyclopentyl-3-ethyl-3H-1,4-benzodiazepin-2-yl)-urea (II),
(45) 1-(2-chloroethyl)-3-[7-nitro-5-(2-pyridyl)-3H-1,4-benzodiazepin-2-yl]-urea (II),
(46) 1-(2-chloroethyl)-3-[8-bromo-5-(4-pyridyl)-3H-1,4-benzodiazepin-3-yl]-urea (II),
(47) 1-(2-chloroethyl)-3-[9-fluoro-5-(2-pyrryl)-3H-1,4-benzodiazepin-2-yl]-urea (II),
(48) 1-(2-chloroethyl)-3-(7-bromo-8-chloro-5-cyclopentyl-3H-1,4-benzodiazepin-2-yl)urea (II),

(49) 1-(2-chloroethyl)-3-(8-bromo-5-cycloheptyl-3-propyl-3H-1,4-benzodiazepin-2-yl)-urea (II),
(50) 1-(2-chloroethyl)-3-[7,9-dichloro-3-ethyl-5-(2-thienyl)-3H-1,4-benzodiazepin-2-yl]ureau (II), In the same manner other haloalkyl isocycamates of formula VI can be substituted in place of 2-chloroethylisocyanate to obtain the corresponding 2 - (haloalkyl)-3 - (3H - 1,4-benzodiazepin-2-yl) ureau of formula II, wherein one or more of the groups R, $R_1$, and $R_2$ are substituted by an alkyl substituent, the following are representative:

(51) 2 - amino - 7 - chloro - 5 - phenyl - 3H - 1,4 - benzodiazepine (III) with 2 - chloropropylisocyanate (VI) to obtain 1 - (2 - chloropropyl) - 3 - (7 - chloro - 5-phenyl - 3H - 1,4 - benzodiazepin - 2 - yl) - ureau (II),
(52) 2 - amino - 7 - chloro - 5 - (o-chlorophenyl) - 3H-1,4 - benzodiazepine (III) with 1 - (chloromethyl) - 1-methyl - propyl - isocyanate to obtain 1 - [1 - chloromethyl - 1 - methylpropyl - 3 - [7 - chloro - 5 - (o-chlorophenyl) - 3H - 1,4 - benzodiazepin - 2 - yl] - urea (II),
(53) 2 - amino - 8 - cyano - 5 - [p - trifluoromethyl)-phenyl] - 3H - 1,4 - benzodiazepine (III) with 2-bromo - 1 - ethyl - 1 - methylpropylisocyanate (VI) to obtain 1 - (2 - bromo - 1 - ethyl - methylpropyl) - 3-[8 - cyano - 5 - p - (trifluoromethyl)phenyl - 3H - 1,4-benzodiazepin - 2 - yl] - urea (II),
(54) 2 - amino - 9 - chloro - 5 - (4 - pyridyl) - 3H - 1,4-benzodiazepine (III) with 2 - chloro - 1 - ethyl - 1-methylbutyl - isocyanate to obtain 1 - (2 - chloro - 1-ethyl - 1 - methylbutyl) - 3 - [9 - chloro - 5 - (4 - pyridyl) - 3H - 1,4 - benzodiazepin - 2 - yl] - urea (II),
(55) 2 - amino - 5 - (1 - cyclohexenyl) - 7 - nitro - 3-propyl - 3H - 1,4 - benzodiazepine (III) with 2 - chloro - 1,1,3 - trimethylbutyl isocyanate to obtain 1 - (2-chloro - 1,1,3 - trimethylbutyl) - 3 - [5 - (1 - cyclohexenyl) - 7 - nitro - 3 - propyl - 3H - 1,4 - benzodiazepin - 2 - yl] - urea (II), and the like.

EXAMPLE 3

1-(7-chloro-5-phenyl-3H-1,4-benzodiazepin-2-yl)-2-imidazolidinone (Ia)

To a solution of 2.62 g. (0.007 mole) of 1-(2-chloroethyl - 3 - (7 - chloro - 5 - phenyl - 3H - 1,4 - benzodiazepin - 2 - yl) - urea (II) in 50 ml. of tetrahydrofuran under nitrogen is added with stirring 1 g. (0.02 mole) of 56% sodium hydride in mineral oil. After stirring at room temperature overnight the mixture is concentrated in vacuo, diluted with water and pentane, and neutralized with acetic acid. After thorough shaking the solid is collected, washed with water and pentane and dried giving 2.4 g. of nearly white solid. The solid thus obtained is dissolved in 75 ml. of isopropanol and 50 ml. of tetrahydrofuran, filtered hot, concentrated, and cooled giving 1.2 g. (50% yield) of 1 - (7 - chloro - 5 - phenyl - 3H - 1,4 - benzodiazepin - 2 - yl) - 2 - imidazolidinone (Ia), m.p. 231–233.5° C. Recrystallization from 100 ml of isopropanol gives 1.17 g of 1 - (7 - chloro - 5 - phenyl - 3H - 1,4 - benzodiazepin - 2 - yl) - 2 - imidazolidnone (Ia) m.p. 235–238.5° C. (dec.) IR, NMR and mass spec. support the structure.

Analysis.—Calcd. for $C_{18}H_{15}ClN_4O$: C, 63.81; H, 4.46; Cl, 10.46; N, 16.54. Found: C, 64.08; H, 4.63; Cl, 10.52; N, 17.02.

EXAMPLE 4

1-(7-chloro-5-phenyl-3H-1,4-benzodiazepin-2-yl)-2-imidazolidinone (Ia)

Example 3 was repeated to give 1 - (7 - chloro - 5-phenyl - 3H - 1,4 - benzodiazepin - 2 - yl) - 2 - imidazolidinone (Ia), mp. 242–245° C. (dec.)

EXAMPLE 5

1-[7-chloro-5-(o-chlorophenyl)-3H-1,4-benzodiazepin-2-yl]-2-imidazolidione (Ia)

To a solution of 4.1 g. (0.01 mole) of 1 -( 2 - chloroethyl - 3 - [7 - chloro - 5 - (o - chlorophenyl) - 3H - 1,4-benzodiazepin - 2-yl]-urea (II) in 50 ml. of tetrahydrofuran, under nitrogen, is added portion-wise with stirring 1.5 g. (0.035 mole) of 56% sodium hydride in mineral oil. After stirring at room temperature for 17 hr the mixture is evaporated in vacuo at 30° C.; the residue thus obtained is well shaken with water and pentane and neutralized with acetic acid. The resulting solid is collected, washed with water and pentane and dried giving 3.1 g. of solid, which is dissolved in 125 ml. of ethyl acetate, treated with activated charcoal, filtered and concentrated to about 25 ml. The solution is diluted to 115 ml. wth absolute ether and on standing crystalline solid separates. The solid thus obtained is collected, washed with ether and dried yielding 1.16 g (31% yield) of 1 - [7 - chloro - 5 - (o-chlorophenyl) - 3H - 1,4 - benzodiazepin - 2 - yl] - 2 - imidazolidione (Ia); m.p. 197–199° C.; IR and NMR confirm the structure.

Analysis.—Calcd. for $C_{18}H_{14}Cl_2N_4O$: C, 57.92; H, 3.78; Cl, 19.00; N, 15.01. Found: C, 57.85; H, 4.10; Cl, 19.00; N, 14.86.

Following the procedure of Example 3 or 5 above, but substituting other representative 1-(2-haloalkyl)-3-(3H-1,4-benzodiazepin-2-yl)-ureas (II) as starting materials, such as those listed in the paragraphs following Example 2, above, yields, respectively.

(1) 1-(5-phenyl-3H-1,4-benzodiazepin-2-yl)-2-imidazolidinone (Ia)
(2) 1-[5-(m-bromophenyl)-6-chloro-3H-1,4-benzodiazepin-2-yl]-2-imidazolidinone (Ia),
(3) 1-(8-chloro-5-phenyl-3H-1,4-benzodiazepin-2-yl)-2-imidazolidinone (Ia),
(4) 1-[6-chloro-5-(3,4-dimethylphenyl)-3H-1,4-benzodiazepin-2-yl]-2-imidazolidinone (Ia),
(5) 1-[5-(2-methyl-4-methoxyphenyl)-3H-1,4-benzodiazepin-2-yl]-2-imidazolidinone (Ia),
(6) 1-(9-bromo-5-phenyl-3H-1,4-benzodiazepin-2-yl)-2-imidazolidinone (Ia),
(7) 1-(7-nitro-5-phenyl-3H-1,4-benzodiazepin-2-yl)-2-imidazolidinone (Ia),
(8) 1-[5-[P-(propionylamino)phenyl]-9-trifluoromethyl-3H-1,4-benzodiazepin-2-yl]-2-imidazolidinone (Ia),
(9) 1-[8-cyano-5-[p-(trifluoromethyl)phenyl]-3H-1,4-benzodiazepin-2-yl]-2-imidazolidinone (Ia),
(10) 1-[7-chloro-5-(o-chlorophenyl)-3H-1,4-benzodiazepin-2-yl]-2-imidazolidinone (Ia),
(11) 1-[6-ethylthio-5-(o-bromophenyl)-3H-1,4-benzodiazepin-2-yl]-2-imidazolidinone (Ia),
(12) 1-[6,8-dichloro-5-(o-fluorophenyl)-3H-1,4-benzodiazepin-2-yl]-2-imidazolidinone (Ia),
(13) 1-[7-bromo-5-[m-(ethylsulfinyl)phenyl]-8-propoxy-3H-1,4-benzodiazepin-2-yl]-2-imidazolidinone (Ia),
(14) 1-[9-diisopropylamino-7-methyl-5-[m-(propylsulfonyl)phenyl]-3H-1,4-benzodiazepin-2-yl]-2-imidazolidinone (Ia),
(15) 1-[7-bromo-5-(o-fluorophenyl)-3H-1,4-benzodiazepin-2-yl]-2-imidazolidinone (Ia),
(16) 1-[5-(o-fluorophenyl)-3-methyl-3H-1,4-benzodiazepin-2-yl]-2-imidazolidinone (Ia),
(17) 1-[5-(p-fluorophenyl)-3-methyl-3H-1,4-benzodiazepin-2-yl]-2-imidazolidinone (Ia),
(18) 1-[7-bromo-5-(o-bromophenyl)-3H-1,4-benzodiazepin-2-yl]-2-imidazlidinone (Ia),
(19) 1-[5-(o-fluorophenyl)-7-methylsulfinyl-3H-1,4-benzodiazepin-2-yl]-2-imidazolidinone (Ia),
(20) 1-(7-methylthio-5-phenyl-3H-1,4-benzodiazepin-2-yl)-2-imidazolidinone (Ia),

(21) 1-[5-(o-chlorophenyl)-3,6,8-trimethyl-3H-1,4-benzodiazepin-2-yl]-2-imidazolidinone (Ia),
(22) 1-[7,8-dicyano-5-[p-(methylsulfonyl)phenyl]-3H-1,4-benzodiazepin-2-yl]-imidazolidinone (Ia),
(23) 1-[6,8-diethyl-5-(m-ethylphenyl)-3H-1,4-benzodiazepin-2-yl]-2-imidazolidinone (Ia),
(24) 1-[5-(o-cyanophenyl)-6-nitro-3H-1,4-benzodiazepin-2-yl]-2-imidazolidinone (Ia),
(25) 1-[9-acetylamino-5-(p-cyanophenyl)-3H-1,4-benzodiazepin-2-yl]-2-imidazolidinone (Ia),
(26) 1-[7-chloro-5-(4-pyridyl)-3H-1,4-benzodiazepin-2-yl]-2-imidazolidinone (Ia),
(27) 1-[3-ethyl-7-fluoro-5-(2-pyrryl)-3H-1,4-benzodiazepin-2-yl]-2-imidazolidinone (Ia),
(28) 1-[7,9-dichloro-3-propyl-5-(2-thienyl)-3H-1,4-benzodiazepin-2-yl]-2-imidazolidinone (Ia),
(29) 1-[7-bromo-5-(4-pyridyl)-3H-1,4-benzodiazepin-2-yl]-2-imidazolidinone (Ia),
(30) 1-[3-methyl-7-nitro-5-(2-pyrimidyl)-3H-1,4-benzodiazepin-2-yl]-2-imidazolidinone (Ia),
(31) 1-(5-cyclopentyl-3-methyl-7-trifluormethyl-3H-1,4-benzodiazepin-2-yl)-2-imidazolinone (Ia),
(32) 1-(7-chloro-5-cycloheptyl-3-ethyl-3H-1,4-benzodiazepin-2-yl)-2-imidazolidinone (Ia),
(33) 1-[3-methyl-5-(2-pyridyl)-7-trifluoromethyl-3H-1,4-benzodiazepin-2-yl]-2-imidazolidinone (Ia),
(34) 1-[9-chloro-5-(4-pyridyl)-7-trifluoromethyl-3H-1,4-benzodiazepin-2-yl]-2-imidazolidinone (Ia),
(35) 1-[5-(2-pyrryl)-3H-1,4-benzodiazepin-2-yl]-2-imidazolidinone (Ia),
(36) 1-[7-iodo-8-nitro-5-(2-pyridyl)-3H-1,4-benzodiazepin-2-yl]-2-imidazolidinone (Ia),
(37) 1-[3-ethyl-7-nitro-5-(2-pyrryl)-3H-1,4-benzodiazepin-2-yl]-2-imidazolidinone (Ia),
(38) 1-[5-(2-furyl)-7-methylthio-9-nitro-3H-1,4-benzodiazepin-2-yl]-2-imidazolidinone (Ia),
(39) 1-(7,8-dibromo-3-methyl-5-(4-pyridyl)-3H-1,4-benzodiazepin-2-yl]-2-imidazolidinone (Ia),
(40) 1-[7-chloro-5-(1-cyclopentyl)-3H-1,4-benzodiazepin-2-yl]-2-imidazolidinone (Ia),
(41) 1-[5-(1-cyclohexenyl)-7-nitro-3-propyl-3H-1,4-benzodiazepin-2-yl]-2-imidazolidinone (Ia),
(42) 1-[8-bromo-5-(1-cycloheptenyl)-3-ethyl-3H-1,4-benzodiazepin-2-yl]-2-imidazolidinone (Ia),
(43) 1-(7-chloro-5-cyclohexyl-3H-1,4-benzodiazepin-2-yl)-2-imidazolidinone (Ia),
(44) 1-(9-chloro-5-cyclopentyl-3-ethyl-3H-1,4-benzodiazepin-2-yl)-2-imidazolidinone (Ia),
(45) 1-[7-nitro-5-(2-pyridyl)-3H-1,4-benzodiazepin-2-yl]-2-imidazolidinone (Ia),
(46) 1-[8-bromo-5-(4-pyridyl)-3H-1,4-benzodiazepin-2-yl]-2-imidazolidinone (Ia),
(47) 1-[9-fluoro-5-(2-pyrryl)-3H-1,4-benzodiazepin-2-yl]-2-imidazoldinne (Ia),
(48) 1-(7-bromo-8-chloro-5-cyclopentyl-3H-1,4-benzodiazepin-2-yl)-2-imidazolidinone (Ia),
(49) 1-(8-bromo-5-cycloheptyl-3-propyl-3H-1,4-benzodiazepin-2-yl)-2-imidazolidinone (Ia),
(50) 1-[7,9-dichloro-3-ethyl-5-(2-thienyl)-3H-1,4-benzodiazepin-2-yl]-2-imidazolidinone (Ia),
(51) 1-(7-chloro-5-phenyl-3H-1,4-benzodiazepin-2-yl)-5-methyl-2-imidazolidinone (Ia),
(52) 1-[7-chloro-5-(o-chlorophenyl)-3H-1,4-benzodiazepin-2-yl]-4-ethyl-4-methyl-2-imidazolidinone (Ia),
(53) 1-[8-cyano-5-[p-(trifluoromethyl)phenyl]-3H-1,4-benzodiazepin-2-yl]-4,5-dimethyl-4-ethyl-2-imidazolidinone (Ia),
(54) 1-[9-chloro-5-(4-pyridyl)-3H-1,4-benzodiazepin-2-yl]-4,5-diethyl-4-methyl-2-imidazolidinone (Ia),
(55) 1-[5-(1-cyclohexenyl)-7-nitro-3-propyl-3H-1,4-benzodiazepin-2-yl]-5-isopropyl-4,5-dimethyl-2-imidazolidinone (Ia), and the like.

EXAMPLE 6

1-(7-chloro-5-phenyl-3H-1,4-benzodiazepin-2-yl)-3-methyl-2-imidazolidinone (Ib)

To a solution of 2.70 g. (0.008 mole) of 1(7-chloro-5-phenyl-3H-1,4-benzodiazepin-yl)-2-imidazolidinone (Ia), in 50 ml. of dimethylformamide under nitrogen, is slowly added with stirring 0.602 ml. [2.0 g. (0.008 mole)] of thallium ethoxide. After stirring for 15 min. 0.62 ml. (0.01 mole) of methyl iodide is added dropwise over a period of about 5 minutes. Stirring at room temperature is contined for about 18.5 hr. The solid thallium iodide is removed by filtration and well extracted with dimethylformamide. The dimethylformamide solution is concentrated in vacuo at 40° and diluted with water. After thorough shaking the solid thus obtained is collected, washed with water and dried giving 2.58 g. of product showing 1 spot on thin-layer chromatography ($SiO_2$, 5% MeOH in $CHCl_3$ or 60% EtoAc in cyclohexane). The solid thus obtained is recrystallized from 130 ml. of isopropanol and filtered hot to give 2.32 g. of 1-(7-chloro-5-phenyl-3H-1,4-benzodiazepin-2-yl)-3-methyl-2-imidazolidinone (Ib), m.p. 212–215° C. Infrared (IR) and nuclear magnetic resonance (NMR) spectra confirm the structure.

Analysis.—Calcd. for $C_{19}H_{17}ClN_4O$: C, 64.68; H, 4.86; Cl, 10.05; N, 15.88. Found: C, 64.46; H, 4.86; Cl, 10.88; N, 15.04.

EXAMPLE 7

1-[7-chloro-5-(o-chlorophenyl)-3H-1,4-benzodiazepin-2-yl]-3-methyl-2-imidazolidinone (Ib)

Following the procedure of Example 6, above, 1-[7-chloro - 5 - (o-chlorophenyl)-3H-1,4-benzodiazepin-2-yl]-2-imidazolidinone (Ia) can be converted to 1-[7-chloro-5(o-chlorophenyl) - 3H - 1,4 - benzodiazepin-2-yl]-3-methyl-2-imidazolidinone (Ib).

Following the procedure of Example 6, above, but substituting other representative 1-(3H-1,4-benzodiazepin-2-yl)-2-imidazolidinones (Ia) as starting materials, such as those prepared and listed in the paragraph following Example 5, above, yields, respectively, (1) 1-(5-phenyl-3H-1,4-benzidiazepin-2-yl)-3-methyl-2-imidazolidinone (Ib),
(2) 1-[5-(m-bromophenyl)-6-chloro-3H-1,4-benzodiazepin-2-yl]-3-methyl-2-imidazolidinone (Ib),
(3) 1-(8-chloro-5-phenyl-3H-1,4-benzodiazepin-2-yl)-3-methyl-2-imidazolidinone (Ib),
(4) 1-[6-chloro-5-(3,4-dimethylphenyl)-3H-1,4-benzodiazepin-2-yl]-3-methyl-2-imidazolidinone (Ib),
(5) 1-[5-(2-methyl-4-methoxyphenyl)-3H-1,4-benzodiazepin-2-yl]-3-methyl-2-imidazolidinone (Ib),
(6) 1-(9-bromo-5-phenyl-3H-1,4-benzidiazepin-2-yl)-3-methyl-2-imidazolidinone (Ib),
(7) 1-(7-nitro-5-phenyl-3H-1,4-benzodiazepin-2-yl)-3-methyl-2-imidazolidinone (Ib),
(8) 1-[5-[p-(propionylamino)phenyl]-9-trifluoromethyl-3H-1,4-benzodiazepin-2-yl]-3-methyl-2-imidazolidinone (Ib),
(9) 1-[8-cyano-5-[p-(trifluoromethyl)phenyl]-3H-1,4-benzodiazepin-2-yl]-3-methyl-2-imidazolidinone (Ib),
(10) 1-[7-chloro-5-(o-chlorophenyl)-3H-1,4-benzodiazepin-2-yl]-3-methyl-2-imidazolidinone (Ib),
(11) 1-[6-ethylthio-5-(o-bromophenyl)-3H-1,4-benzodiazepin-2-yl]-3-methyl-2-imidazolidinone (Ib),
(12) 1-[6,8-dichloro-5-(o-fluorophenyl)-3H-1,4-benzodiazepin-2-yl]-3-methyl-2-imidazolidinone (Ib),
(13) 1-[7-bromo-5-(m-(ethylsulfinyl)phenyl]-8-propoxy-3H-1,4-benzidiazepin-2-yl]-3-methyl-2-imidazolidinone (Ib),
(14) 1-[9-diisopropylamino-7-methyl-5-[m-(propylsulfonyl)phenyl]-3H-1,4-benzodiazepin-2-yl]-3-methyl-2-imidazolidinone (Ib),
(15) 1-[7-bromo-5-(o-fluorophenyl)-3H-1,4-benzodiazepin-2-yl]-3-methyl-2-imidazolidinone (Ib),
(16) 1-[5-(o-fluorophenyl)-3-methyl-3H-1,4-benzodiazepin-2-yl]-3-methyl-2-imidazolidinone (Ib),
(17) 1-[5-(o-fluorophenyl)-3-methyl-3H-1,4-benzodiazepin-2-yl]-3-methyl-2-imidazolidinone (Ib),

(18) 1-[7-bromo-5-(o-bromophenyl)-3H-1,4-benzodiazepin-2-yl]-3-methyl-2-imidazolidinone (Ib),
(19) 1-[5-(o-fluorophenyl)-7-methylsulfinyl-3H-1,4-benzodiazepin-2-yl]-3-methyl-2-imidazolidinone (Ib),
(20) 1-(7-methylthio-5-phenyl-3H-1,4-benzodiazepin-2-yl)-3-methyl-2-imidazolidinone (Ib),
(21) 1-[5-o-chlorophenyl)-3,6,8-trimethyl-3H-1,4-benzodiazepin-2-yl]-3-methyl-2-imidazolidinone (Ib),
(22) 1-[7,8-dicyano-5-[p-(methylsulfonyl)phenyl]-3H-1,4-benzodiazepin-2-yl]-3-methyl-2-imidazolidinone (Ib),
(23) 1-[6,8-diethyl-5-(m-ethylphenyl)-3H-1,4-benzodiazepin-2-yl]-3-methyl-2-imidazolidinone (Ib),
(24) 1-[5-(o-cyanophenyl)-6-nitro-3H-1,4-benzodiazepin-2-yl]-3-methyl-2-imidazolidinone (Ib),
(25) 1-[9-acetylamino-5-(p-cyanophenyl)-3H-1,4-benzodiazepin-2-yl]-3-methyl-2-imidazolidinone (Ib),
(26) 1-[7-chloro-5-(4-pyridyl)-3H-1,4-benzodiazepin-2-yl]-3-methyl-2-imidazolidinone (Ib),
(27) 1-[3-ethyl-7-fluoro-5-(2-pyrryl)-3H-1,4-benzodiazepin-2-yl]-3-methyl-2-imidazolidinone (Ib),
(28) 1-[7,9-dichloro-3-propyl-5-(2-thienyl)-3H-1,4-benzodiazepin-2-yl]-3-methyl-2-imidazolidinone (Ib),
(29) 1-[7-bromo-5-(4-pyridyl)-3H-1,4-benzodiazepin-2yl]-3-methyl-2-imidazolidinone (Ib),
(30) 1-[3-methyl-7-nitro-5-(2-pyrimidyl)-3H-1,4-benzodiazepin-2-yl]-3-methyl-3-imidazolidinone (Ib),
(31) 1-(5-cyclopentyl-3-methyl-7-trifluoromethyl-3H-1,4-zenzodiazepin-2-yl)-3-methyl-2-imidazolidinone (Ib),
(32) 1-(7-chloro-5-cycloheptyl-3-ethyl-3H-1,4-benzodiazepin-2-yl)-3-methyl-2-imidazolidinone (Ib),
(33) 1-[3-methyl-5-(2-pyridyl)-7-trifluoromethyl-3H-1,4-benzodiazepin-2-yl]-3-methyl-2-imidazolidinone (Ib),
(34) 1-[9-chloro-5-(4-pyridyl)-1-trifluoromethyl-3H-1,4-benzodiazepin-2-yl]-3-methyl-2-imidazolidinone (Ib),
(35) 1-[5-(2-pyrryl)-3H-1,4-benzodiazepin-2-yl]-3-methyl-2-imidazolidinone (Ib),
(36) 1-[7-iodo-8-nitro-5-(2-pyridyl)-3H-1,4-benzodiazepin-2-yl]-3-methyl-2-imidazolidinone (Ib),
(37) 1-[3-ethyl-7-nitro-5-(2-pyrryl)-3H-1,4-benzodiazepin-2-yl]-3-methyl-2-imidazolidinone (Ib),
(38) 1-[5-(2-furyl)-7-methylthio-9-nitro-3H-1,4-benzodiazepin-2-yl]-3-methyl-2-imidazolidinone (Ib),
(39) 1-[7,8-dibromo-3-methyl-5-(4-pyridyl)-3H-1,4-benzodiazepin-2-yl]-3-methyl-2-imidazolidinone (Ib),
(40) 1-[7-chloro-5-(1-cyclopentyl)-3H-1,4-benzodiazepin-2-yl]-3-methyl-2-imidazolidinone (Ib),
(41) 1-[5-(1-cyclohexenyl)-7-nitro-3-propyl-3H-1,4-benzodiazepin-2-yl]-3-methyl-2-imidazolidinone (Ib),
(42) 1-[8-bromo-5-(1-cycloheptenyl)-3-ethyl-3H-1,4-benzodiazepin-2-yl]-3-methyl-2-imidazolidinone (Ib),
(43) 1-(7-chloro-5-cyclohexyl-3H-1,4-benzodiazepin-2-yl)-3-methyl-2-imidazolidinone (Ib),
(44) 1-(9-chloro-5-cyclopentyl-3-ethyl-3H-1,4-benzodiazepin-2-yl)-3-methyl-2-imidazolidinone (Ib),
(45) 1-[7-nitro-5-(2-pyridyl)-3H-1,4-benzodiazepin-2-yl]-3-methyl-2-imidazolidinone (Ib),
(46) 1-[8-bromo-5-(4-pyridyl)-3H-1,4-benzodiazepin-2-yl]-3-methyl-2-imidazolidinone (Ib),
(47) 1-[9-fluoro-5-(2-pyrryl)-3H-1,4-benzodiazepin-2-yl]-3-methyl-2-imidazolidinone (Ib),
(48) 1-(7-bromo-8-chloro-5-cyclopentyl-3H-1,4-benzodiazepin-2-yl)-3-methyl-2-imidazolidinone (Ib),
(49) 1-(8-bromo-5-cycloheptyl-3-propyl-3H-1,4-benzodiazepin-2-yl)-3-methyl-2-imidazolidinone (Ib),
(50) 1-[7,9-dichloro-3-ethyl-5-(2-thienyl)-3H-1,4-benzodiazepin-2-yl]-3-methyl-2-imidazolidinone (Ib),
(51) 1-(7-chloro-5-phenyl-3H-1,4-benzodiazepin-2-yl)-3,5-dimethyl-2-imidazolidinone (Ib),
(52) 1-[7-chloro-5-(o-chlorophenyl)-3H-1,4-benzodiazepin-2-yl]-3,5-dimethyl-4-ethyl-2-imidazolidinone (Ib),
(53) 1-[8-cyano-5-[p-(trifluoromethyl)phenyl]-3H-1,4-benzodiazepin-2-yl]-4-ethyl-3,4,5-trimethyl-2-imidazolidinone (Ib),
(54) 1-[9-chloro-5-(4-pyridyl)-3H-1,4-benzodiazepin-2-yl]-4,5-diethyl-3,4-dimethyl-2-imidazolidinone (Ib),
(55) 1-[5-(1-cyclohexenyl)-7-nitro-3-propyl-3H-1,4-benzodiazepin-2-yl]-5-isopropyl-3,4,4-trimethyl-2-imidazolidinone (Ib), and the like.

In the same manner following the procedure of Example 6, above, but substituting other alkylhalides or alkenylhalides of formula VII in place of methyl iodide is productive of the corresponding 1-(3H-1,4-benzodiazepin-2-yl)-3-alkyl-2-imidazolidinones and 1-(3H-1,4-benzodiazepin-2-yl)-3-alkenyl-2-imidazolidinones of formula (Ib), the following are representative:

1 - (7 - chloro - 5 - phenyl-3H-1,4-benzodiazepin-2-yl)-2-imidazolidinone (Ia) with ethyl bromide to obtain 1-(7 - chloro - 5 - phenyl-3H-1,4-benzodiazepin-2-yl)-3-ethyl-2-imidazolidinone (Ib), 1 - [7 - chloro-5-(o-chlorophenyl)-3H-1,4-benzodiazepin-2-yl]-2-imidazolidinone (Ia) with propyl chloride to obtain 1 - [7-chloro-5-(o-chlorophenyl)-3H-1,4-benzodiazepin-2-yl]-3-propyl-2-imidazolidinone (Ib), 1 - (7 - chloro-5-phenyl-3H-1,4-benzodiazepin-2-yl)-5-methyl-2-imidazolidinone (Ia) with isopropyl iodide to obtain 1 - (7-chloro-5-phenyl-3H-1,4-benzodiazepin-2-yl)-3-isopropyl-5-methyl-2-imidazolidinone (Ib), 1 - [7,9 - dichloro-3-ethyl-5-(2-thienyl)-3H-1,4-benzodiazepin-2-yl]-2-imidazolidinone (Ia) with crotyl bromide to obtain 1-[7,9-dichloro-3-ethyl-5-(2-thienyl)-3H-1,4 - benzodiazepin - 2 - yl]-3-crotyl-2-imidazolidinone (Ib), 1 - (5 - phenyl-3H-1,4-benzodiazepin-2-yl)-2-imidazolidinone (Ia) with methallyl iodide to obtain 1-(5-phenyl-3H - 1,4-benzodiazepin-2-yl)-3-methallyl-2-imidazolidinone (Ib), 1 - [9 - chloro-5-(4-pyridyl)-3H-1,4-benzodiazepin-2-yl]-4,5-diethyl-4-methyl-2-imidazolidinone (Ia) with allyl chloride to obtain 1-[9-chloro-5-(4-pyridyl)-3H-1,4-benzodiazepin - 2-yl]-3-allyl-4,5-diethyl-4-methyl-2-imidazolidinone (Ib), and the like.

What is claimed is:
1. A compound of the formula

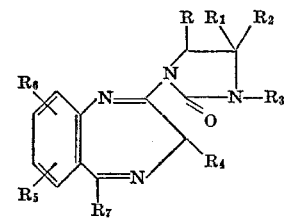

wherein R, $R_1$ and $R_2$ are each selected from the group consisting of hydrogen and lower alkyl of 1 to 3 carbon atoms, inclusive; $R_3$ is selected from the group consisting of hydrogen, lower alkyl of 1 to 4 carbon atoms, inclusive, and lower alkenyl of 3 to 4 carbon atoms, inclusive; $R_4$ is selected from the group consisting of hydrogen, alkyl of 1 to 3 carbon atoms, inclusive, hydroxy, acetoxy and propionoxy; $R_5$ is hydrogen; $R_6$ is selected from the group consisting of hydrogen and halogen; and $R_7$ is selected from the group consisting of phenyl, mono-halophenyl, 2-pyridyl and 4-pyridyl.

2. A compound of claim 1 wherein $R_6$ is selected from the group consisting of hydrogen, 7-chloro and 7-fluoro and $R_7$ is selected from the group consisting of phenyl, o-chlorophenyl, o-fluorophenyl, 2-pyridyl and 4-pyridyl.

3. A compound of claim 1 wherein $R_6$ is selected from the group consisting of hydrogen and 7-chloro and $R_7$ is selected from the group consisting of phenyl, o-chlorophenyl and o-fluorophenyl.

4. 1 - (7-chloro-5-phenyl-3H-1,4-benzodiazepin-2-yl)-2-imidazolidinone.

5. 1 - [7-chloro-5-(o-chlorophenyl)-3H-1,4-benzodiazepin-2-yl]-2-imidazolidinone.

6. 1 - (7-chloro-5-phenyl-3H-1,4-benzodiazepin-2-yl)-3-methyl-2-imidazolidinone.

7. 1 - [7-chloro-5-(o-chlorophenyl)-3H-1,4-benzodiazepin-2-yl]-3-methyl-2-imidazolidinone.

References Cited
UNITED STATES PATENTS

| | | | |
|---|---|---|---|
| 3,400,128 | 9/1968 | Berger et al. | 260—239 BD |
| 3,438,972 | 4/1969 | Metlesico et al. | 260—239 BD |
| 3,492,290 | 1/1970 | Field et al. | 260—239 BD |
| 3,652,754 | 3/1972 | Meguro et al. | 260—239 BD |

OTHER REFERENCES

Sternbach et al.: Symposium on CNS Drugs—A Symposium Held at the Regional Research Laboratory, Hyderabad, India—reprint of pp. 53–69, CSIR New Delhi, India, 1966.

Bell et al.: J. Med. Pharm. Chem., vol. 5, pp. 63–9 (1962).

NATALIE TROUSOF, Primary Examiner

U.S. Cl. X.R.

260—239 BD, 256.4 R, 256.5 R, 294.8 C, 294.9, 295 K, 296 B, 326.34, 326.5 S, 326.5 CA, 326.9, 326.62, 329 F, 332.2 R